(12) United States Patent
Begin et al.

(10) Patent No.: US 9,688,481 B2
(45) Date of Patent: Jun. 27, 2017

(54) DEVICE AND METHOD OF POSITIONING PRODUCTS

(71) Applicant: C.E.R.M.E.X. CONSTRUCTIONS ETUDES ET RECHERCHES DE MATERIELS POUR L'EMBALLAGE D'EXPEDITION, Corcelles-les-Citeaux (FR)

(72) Inventors: Michel Begin, Corcelles-les-Citeaux (FR); Thierry Garnier, Corcelles-les-Citeaux (FR); Benoit Poutot, Corcelles-les-Citeaux (FR); Guillaume Duchemin, Corcelles-les-Citeaux (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 0 days.

(21) Appl. No.: 14/665,721

(22) Filed: Mar. 23, 2015

(65) Prior Publication Data
US 2015/0266676 A1    Sep. 24, 2015

(30) Foreign Application Priority Data
Mar. 24, 2014 (FR) ..................... 14 00699

(51) Int. Cl.
*B65G 47/24* (2006.01)
*B65G 47/244* (2006.01)

(52) U.S. Cl.
CPC .... *B65G 47/244* (2013.01); *B65G 2201/0244* (2013.01)

(58) Field of Classification Search
CPC ...... B65G 47/244; B65G 47/22; B65G 47/24; B65G 47/2445
(Continued)

(56) References Cited

U.S. PATENT DOCUMENTS 3,677,389 A * 7/1972 Benatar ............... B65G 17/005
                                                          198/374
3,958,688 A   5/1976 Sterling
(Continued)

FOREIGN PATENT DOCUMENTS

EP      1 020 380 A1    7/2000
EP      1 801 014 A1    6/2007
(Continued)

OTHER PUBLICATIONS

Communication dated Jul. 16, 2015, issued by the European Patent Office in corresponding European Application No. 15 16 0247.

*Primary Examiner* — James R Bidwell
(74) *Attorney, Agent, or Firm* — Sughrue Mion, PLLC (57) ABSTRACT

A positioning device (1) for positioning products (2) simultaneously with their conveyance one after the other in a plane of conveyance (3) and along a direction of conveyance (4). The device has at least one orientation mechanism (5), itself having at least one pusher (6) movable along an action movement between an inactive position and an active position. The effect of the action movement is to act on a product (2) by pushing it to make it pivot by a predetermined angle around an axis perpendicular to the plane of conveyance (3), the at least one pusher (6) being movable also in the direction of conveyance (4). Also disclosed is a corresponding method.

17 Claims, 5 Drawing Sheets

(58) Field of Classification Search
USPC .............................. 198/397.06, 400, 411, 416
See application file for complete search history.

(56) References Cited

U.S. PATENT DOCUMENTS

| | | | |
|---|---|---|---|
| 4,499,990 A * | 2/1985 | Fishback ............ | B65G 47/2445 198/411 |
| 6,202,392 B1 | 3/2001 | Greenwell et al. | |
| 7,997,401 B2 * | 8/2011 | Fischer ................. | B65G 29/00 198/411 |
| 2001/0039785 A1 | 11/2001 | Greenwell et al. | |
| 2007/0186508 A1 | 8/2007 | Rovers | |
| 2010/0256655 A1 | 10/2010 | Rovers | |

FOREIGN PATENT DOCUMENTS

| | | |
|---|---|---|
| EP | 2 135 825 A1 | 12/2009 |
| FR | 2 285 303 A | 4/1976 |
| WO | 01/19679 A1 | 3/2001 |

\* cited by examiner

DEVICE AND METHOD OF POSITIONING PRODUCTS

The present invention relates to the general domain of conveyance of products, and in particular, its object is a particular device and method for positioning the products, i.e. at least to modify the orientation thereof perpendicular to the plane of conveyance.

Some bottle-type products have flattened faces at their side wall, particularly in order to affix a label for presenting information about their contents. Such bottles, or products, thus have a principal axis which is vertical when the products are positioned upright on a support plane. They may also have an oblong shaped cross section in the plane of conveyance.

Depending on the way these products are positioned, said information located on their flattened faces may or may not be able to be read. Their orientation on display racks is therefore important for merchants and consumers. The orientation of the products once packed in cases is also an important factor for optimization of the volume of said cases.

Facilities are known that enable racks to be produced for displaying such products, in which the products are lined up one behind the other, forming one or more rows.

In order for the products to be all correctly oriented, devices for orienting products have been implemented in facilities to turn the products around an axis perpendicular to the plane of conveyance, i.e. a vertical axis.

The document FR 2,285,303 thus describes a facility equipped with a device for orienting products. The facility includes an endless conveyor on which said products are lined up one behind the other, the endless conveyor having a direction of advance and a direction of feed of said products. In particular, the facility is equipped with a spiral conveyor enabling the spacing of products and a given orientation. The orientation that the products take in the conveyor may or may not be in accordance with the desired orientation. Also, downstream from the spiral conveyor, an orientation device is provided which pivots the product 180°. Such a facility has certain disadvantages, among which the following can be cited:

the conveyor used to orient the products and to space them has dimensions that are adapted to the products. Also, when the types of products processed change shapes or dimensions, it is necessary to change the conveyors. However, changing conveyors necessitates shutting down the facility, which reduces the general productivity of the facility. In certain applications, it may be necessary to offer an alternative solution to the conveyors;

moreover, a storage area must be provided, near the facility, for storing spiral conveyors adapted to the different products to be oriented. The facility as a whole can therefore require an excessive amount of space;

a facility having several conveyors can be expensive, due to the fact that it is necessary to have several different conveyors;

finally, the static orientation downstream of a conveyor risks destabilizing or marking the products, and thus cannot operate at high speed.

In general, the objective of the invention is to propose a technical alternative enabling products to be oriented, i.e. to turn them on the conveyor, by any angle, in such a way that the products are oriented differently before and after the implementation of the invention. The invention further seeks to propose an alternative to the utilization of spiral conveyors, in order to mitigate the aforementioned disadvantages.

To that end, the invention proposes to orient the products by manipulating each product separately by means of a dedicated actuator for each product moving transversely to the direction of conveyance.

Thus, the object of the invention is a positioning device for positioning products simultaneously with their conveyance one behind the other in a plane of conveyance and along a direction of conveyance.

Said device is characterized in that it comprises at least one orientation means, itself comprising at least one pusher movable along an action movement between an inactive position and an active position, the effect of said action movement being to act on a product by pushing it to make it pivot by a predetermined angle around an axis perpendicular to the plane of conveyance, the at least one pusher being movable also in the direction of conveyance.

The object of the invention is also a method for positioning products simultaneously with their conveyance one after another in a plane of conveyance and along a direction of conveyance, comprising an orientation step, during which the products are turned around an axis perpendicular to the plane of conveyance.

Said method is characterized in that said orientation step is achieved by moving the at least one pusher along an action movement, between an inactive position and an active position, the effect of said action movement being to act on a product by pushing it to make it pivot by a predetermined angle around an axis perpendicular to the plane of conveyance, said action movement in particular being parallel to the plane of conveyance and perpendicular to the direction of conveyance.

The invention will be better understood from the following description, which is based on possible embodiments that are explained by way of non-limiting illustration, with reference to the appended figures, in which.

finally.

Thus, the object of the invention is a positioning device 1 for positioning products 2 simultaneously with their conveyance one after the other in a plane of conveyance 3 and along a direction of conveyance 4. The products 2 can be spaced from each other in a more or less regular manner. They are generally disposed one behind the other longitudinally, i.e. in the direction of conveyance 4.

Figure 5:
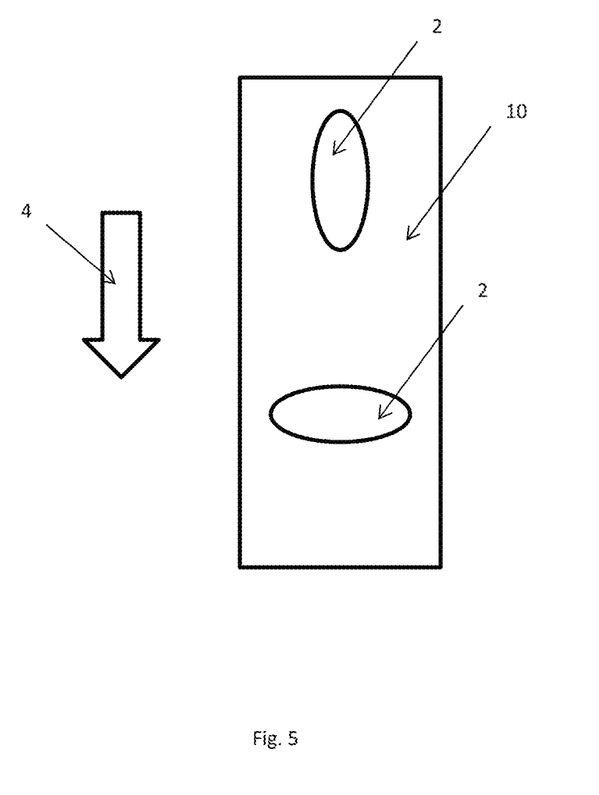
FIG. 5 shows two products of oblong cross section on a conveyor, the product at the top having its longer length in the direction of conveyance, the bottom product having its longer length transverse to the direction of conveyance.

The products 2 generally have a particular shape illustrated in FIG. 5: the shape of the products is not a shape resulting from a symmetry of revolution around a vertical axis. The products 2 are bottles or other objects having an oblong shape, i.e. a shape that is longer than it is wide.

According to the invention, the positioning device 1 comprises at least one orientation means 5, itself comprising at least one pusher 6 movable along an action movement between an inactive position and an active position, the effect of said action movement being to act on a product 2 by pushing it to make it pivot by a predetermined angle around an axis perpendicular to the plane of conveyance 3, the at least one pusher 6 being movable also in the direction of conveyance 4. The orientation means 5 alone thus ensures the orientation of the product 2.

The pushers 6 can be mounted on carriages 7, either fixed or longitudinally movable. Thus, in particular embodiments, the at least one pusher 6 is mounted fixed in the direction of conveyance 4 of a carriage 7, which itself is movable in the direction of conveyance 4. In other embodiments, the at least one pusher 6 is mounted movably in the direction of conveyance 4 of a carriage 7, which itself is movable in the direction of conveyance 4. Alternatively, the pushers 6 can be mounted directly movable on the frame. In those cases, the pusher 6 is mounted movably along the direction of conveyance 4 on a fixed guide rail 8, illustrated in FIG. 3.

According to an additional possible characteristic, the at least one orientation means 5 comprises a pair of similar pushers 6 placed facing each other so as to act together on the same product 2, which makes it possible to have asymmetrical action on the product 2.

The devices according to the invention can be used to process non-symmetrical products 2, as illustrated in FIG. 5. The length of such a product 2, measured in the direction of conveyance 4, changes in accordance with its orientation and the action of the pushers 6 can then be impossible after a first rotation if they cannot be pressed again against the product 2. Thus, in advantageous embodiments, the distance between the two pushers 6 of the pair of the at least one orientation means 5 is adjustable in the direction of conveyance 4, thanks to mobility in said direction of at least one of the two pushers 6, so as to compensate for the variation in dimension of the product 2 according to its orientation by pivoting around an axis perpendicular to the plane of conveyance 3.

It will be understood that it is advantageous for the device to be able to process several products 2 in each cycle. It is therefore equipped with a plurality of orientation means 5, aligned one after the other in the direction of conveyance 4. Thus, each orientation means 5 comprises two pushers 6, and they are then distributed aligned one after the other, half of them being disposed on one side of the line of products 2, the other half being disposed on the other side. The side-by-side pushers 6 can then be governed by the action of one single actuator, or each can be governed by its own actuator. Thus, in particular embodiments, the positioning device 1 comprises at least one pair of orientation means 5, mounted side by side in the direction of conveyance 4, the side-by-side pushers 6 being driven by the same actuator. In other embodiments, the positioning device 1 comprises at least two orientation means 5 mounted side by side in the direction of conveyance 4, the side-by-side pushers 6 being driven by independently controllable actuators.

The relative position of the orientation means 5, or their sequence of action, should be adapted to the position of the products 2 on the conveyor 10. Indeed, the products 2 arrive one after the other, with a more or less repeatable spacing, within a [certain] range of precision. In extreme cases, the products can be spaced completely randomly, without any identifiable form of repetition. It is therefore necessary to identify the position of the products 2 and their reciprocal separation before orienting them. Thus, according to an additional possible characteristic, the positioning device 1 comprises a detection cell 9 mounted upstream from the at least one orientation means 5 in the direction of conveyance 4, in order to detect, one by one, each product 2 to be oriented, as well as a control unit for receiving the signal from said cell 9 and conditioning the functioning of the device.

The object of the invention is also a method for implementing the device that has just been described; namely, a method for positioning products 2 simultaneously with their conveyance one after another in a plane of conveyance 3 and along a direction of conveyance 4, comprising an orientation step, during which the products 2 are turned around an axis perpendicular to the plane of conveyance 3.

Said method is characterized in that said orientation step is achieved by moving at least one pusher 6 along an action movement, between an inactive position and an active position, the effect of said action movement being to act on a product 2 by pushing it to make it pivot by a predetermined angle around an axis perpendicular to the plane of conveyance 3, said action movement in particular being parallel to the plane of conveyance 3 and perpendicular to the direction of conveyance 4. Said movement enables the desired orientation of the products 2 to be obtained directly, without the need to resort to a [worm gear], for example.

In advantageous embodiments, the method further comprises a step of longitudinal positioning of the products 2 in the direction of conveyance 4, so as to position them with respect to each other at a predefined distance, such as by group for example, or at a similar and regular distance from each other, i.e. for spacing. In particular, said longitudinal positioning step is implemented by moving the pusher(s) 6 in the direction of conveyance 4, intermediate pushers 6 also being able to return to inactive position while leaving end pushers 6 in active position delimiting a group of products 2 in contact with each other. Said intermediate pushers 6 can also return between the products in contact in order to stabilize them.

In certain embodiments, the pushers 6 are all positioned in the same way as the products 2 are positioned on the conveyor 10, thanks to a detection cell 9, and they are all actuated at the same time in active position. The actuating of the pushers 6 in the active position ensures the pivoting of the products 2 around an axis perpendicular to the plane of conveyance 3.

In active position, after pivoting the products 2, the pushers 6 formed by fingers are thus positioned between the oriented products 2, so that said fingers can be used in the same way as elements of a grouping means: by moving the pushers 6 longitudinally, the fingers are moved and push the products 2, creating spaces and groups of products 2. In some embodiments, the fingers are in the form of an elbow part.

The device is thus advantageously equipped with a cell 9, placed upstream from the orientation means 5, as well as a module for measuring the position of the products 2 on the conveyor 10. The module could communicate with a device to control the longitudinal movement of the orientation means 5, so that they are positioned according to the same distribution scheme as the products 2 on the conveyor 10.

When all of the randomly spaced products arrive at the orientation means 5, all of the pairs of pushers 6 are actuated at the same time in active position, so that the products 2 are oriented at the same time by pivoting for example by a 90° angle.

Thus, in certain embodiments, the position of the successive products 2 is detected upstream from the orientation step, the method comprising a step consisting essentially of positioning, in a corresponding manner in the direction of conveyance 4, a plurality of pushers 6 located side by side, and this is done prior to their being actuated between their inactive position and their active position.

According to one possible additional characteristic, the orientation step is implemented when the product 2 arrives in a predefined fixed zone, i.e. an immovable zone with respect to the frame on which the conveyor 10 circulates. When a product 2 is located in such a predefined zone, whether its presence there has been detected or calculated following detection upstream, the corresponding orientation means 5 is actuated.

In other forms of embodiment of the method, it comprises a step of positioning a carriage 7, comprising a plurality of pushers 6 side by side in the direction of conveyance 4, in a position such that a first pusher 6 is located facing a product 2 to be oriented, in particular the farthest ahead or the farthest behind according to a referencing scheme, the carriage 7 then being moved in the direction of conveyance 4 and the at least one other pusher 6 being actuated as soon as it is located in front of another product 2.

Finally, in particular forms of embodiment, the method comprises a step consisting of staggering the products 2 transversely in the direction of conveyance 4 under the effect of the action of the at least one pusher 6.

For example, alternatively, after grouping or spacing products 2, the pushers 6 of a carriage 7 are again advanced transversely, while the opposite pushers 6 on the other carriage 7 are withdrawn by being moved transversely the same distance. By alternating the additional advance movement of the pushers 6 of a carriage 7 for a first group, and of the other carriage for the next group, reoriented groups of products 2 are obtained, situated on one side, then the other, of a central line of the conveyor 10.

Thus, the products 2 can be oriented, and possibly grouped, at the same time that they are moved by the conveyor 10.

The method can therefore be carried out in the following way. The endless conveyor 10 is moved at a constant speed, called feed speed, Va. To orient the products 2, the carriages 7 are also moved at a first speed V1 which is substantially identical to the travel speed Va of the conveyor, at least to position a product 2 in front of an orientation means 5. The products are oriented in the following way:

first, at least one product 2 is positioned facing an orientation means 5, the pushers 6 change over from the inactive position to the active position, which causes the orientation of the product 2 by pivoting around an axis perpendicular to the plane of conveyance 3, then, the pair of pushers 6 changes over from its active position to its inactive position, to release the oriented product 2.

Since the pivoting is done at the same time that the carriage 7 advances at a speed V1, when the products 2 are oriented and released, the carriage 7 is located downstream from its initial position.

Also, after release of the oriented products 2, the carriage 7 is moved in a direction opposite to the direction of feed of the products 2, at a second speed V2 which is greater than the speed V1, so as to enable the alignment of the first product 2 of the line facing the first orientation means 5, at the initial position of the carriage 7.

In the case of a facility where the orientation means 5 are used to move the groups of oriented products 2 to a pickup point, i.e. a station downstream from the facility where the group is picked up to be packed, for example, the orientation means 5 are moved to the pickup point at a speed V3, greater than the speed V1 or the feed speed Va of the products. The device then releases the group of products 2 at the pickup point and returns to the initial position at a speed of movement V2.

Figure 1:
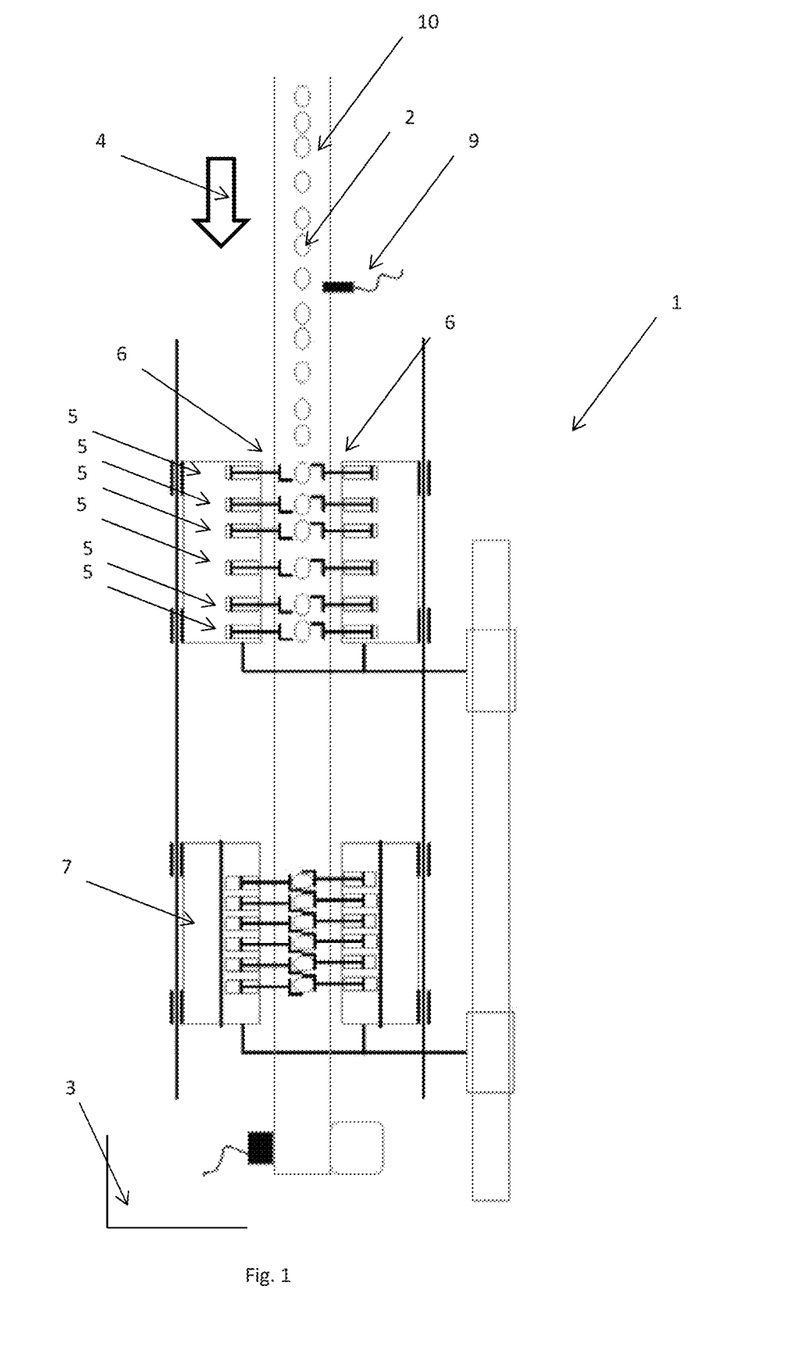
FIG. 1 shows a top view, in the plane of conveyance, of a device in two different states, i.e. either before the pivoting, or thereafter.
Figure 2:
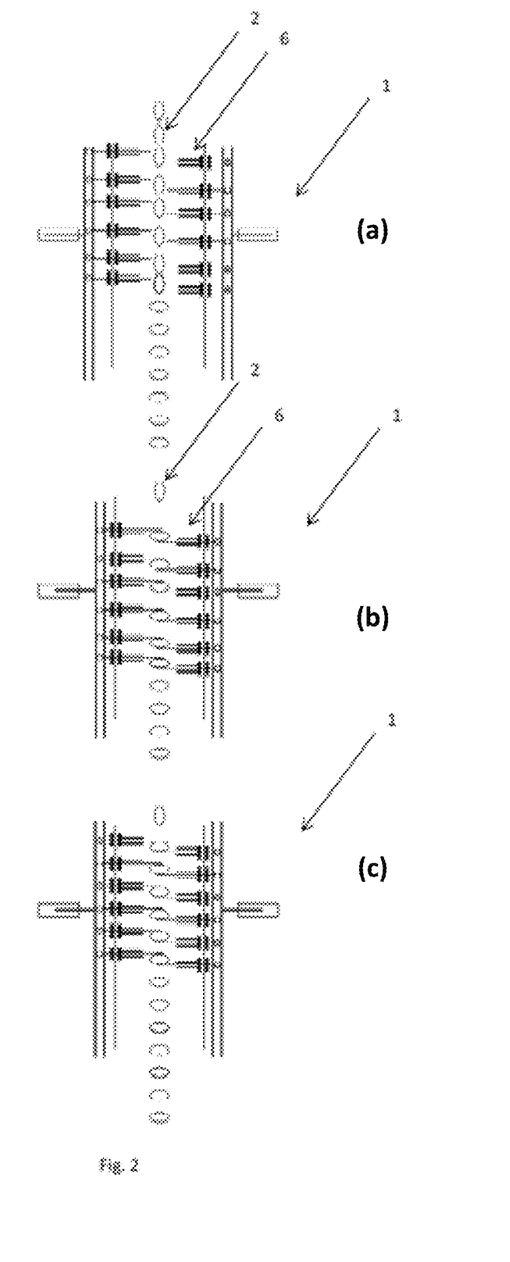
FIG. 2 illustrates a device in which the products are oriented as a result of independent pushers actuated by the same pneumatic cylinder of each side, part (a) illustrating the situation prior to orientation, part (b) the situation during orientation, and part (c) the situation after the grouping.
Figure 3:
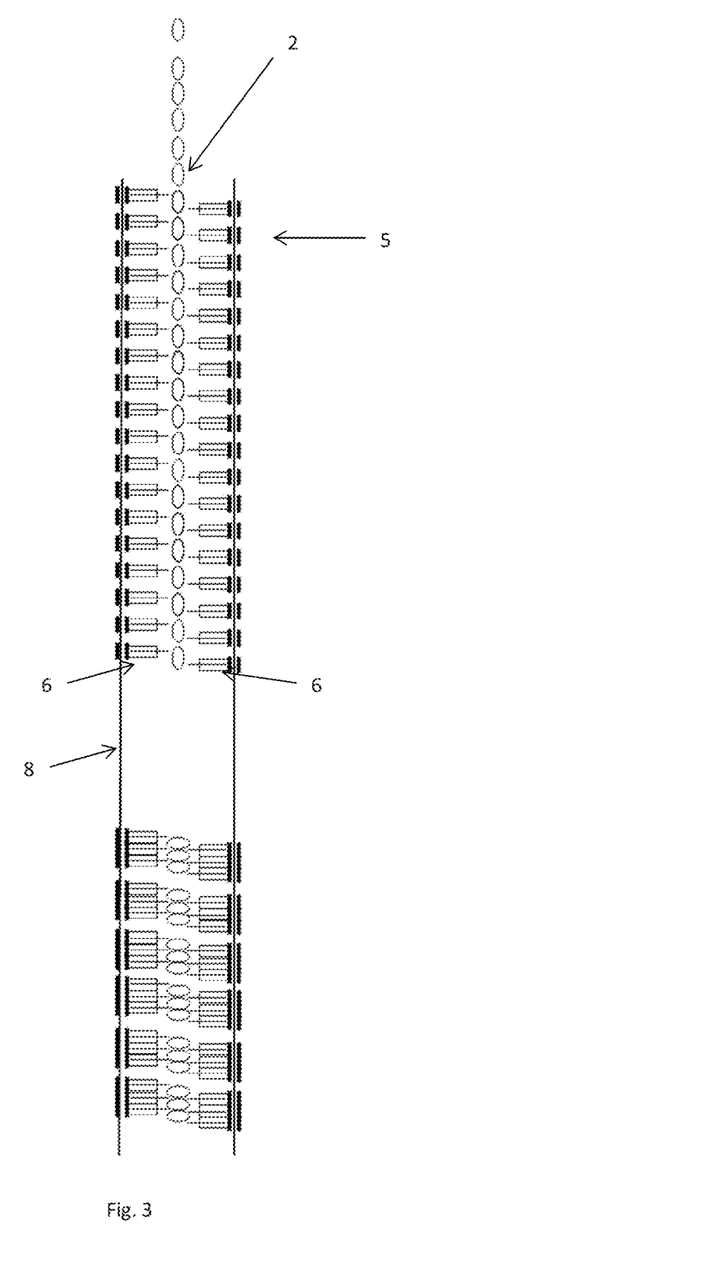
FIG. 3 shows an embodiment where the products are oriented then grouped by independent pushers.

In many embodiments, like those illustrated in FIGS. 1 to 3, the positioning device 1 is capable of processing a plurality of products 2 each time and is therefore equipped with a plurality of orientation means 5, each one processing a product 2. Said orientation means 5 are mounted side by side in the direction of conveyance 4, and each of them is intended to act on a different product 2 driven by the conveyor 10.

The rotation of the product 2 can thus be obtained by the action of a single pusher 6, provided a stop is arranged in front of it, slightly offset in order to obtain the desired effect. In these cases, the orientation means 5 thus only comprises a single pusher 6, and a stop in front thereof, sufficiently offset to create a rotation.

Preferably, however, the pivoting movement of a product 2 around an axis perpendicular to the plane of conveyance 3 is obtained under the effect of two movable pushers 6 mounted facing each other. The orientation means 5 therefore comprises a pair of pushers 6 which are slightly offset in the direction of conveyance 4, in such a way that they each act on one side of the product 2 to create the expected pivoting motion. Thus, two opposite pushers 6 create parallel forces, in opposite directions, preferably parallel to the plane of conveyance 3 and perpendicular to the direction of conveyance 4, the effect of which is to cause the product 2 to pivot around an axis perpendicular to the plane of conveyance 3.

Such an arrangement makes it possible, during the action of the pushers 6, not to offset the product 2 transversely to the direction of conveyance 4. In some cases, the two pushers 6 can then be actuated when the product 2 is located in a symmetrical position with respect to an axis situated at an equal distance from the directions of action of the pushers 6, said pushers having actions of amplitude and force that are preferably similar.

In general, whether the action on a product 2 is performed with one pusher 6 or a plurality thereof, the principle is to act on the product 2 by creating at least two forces, the directions of which are not superimposed, and which together cause a movement comprising a rotation around an axis perpendicular to the plane of conveyance 3. This enables a driving force to be exerted on the product 2, with at least one component parallel to the plane of conveyance 3, while it rests against an offset stop, fixed or mobile. In advantageous embodiments, thanks to their simplicity, each orientation means 5 comprises a pair of pushers 6 each intended to act on one side of the product 2, along a translatory movement perpendicular to the direction of conveyance 4 and parallel to the plane of conveyance 3.

Because the action of the pusher 6 on the product 2 requires a certain amount of time, the pusher 6 must be able to be moved in the direction of conveyance 4, in order to follow the movement of the product 2 during the duration of the action of the pusher 6, and thus avoid forming an obstacle that could knock over the product 2 or deform it. This freedom of movement in the direction of conveyance 4 can be arranged in different ways.

In possible forms of embodiment, the longitudinal mobility of the pusher 6 is provided by a carriage 7 on which the pusher 6 is mounted. As regards said carriage 7, it is mounted with a capacity for longitudinal movement in such a way as to be able to be moved substantially at the same speed as the conveyor 10. The carriage 7 is therefore mounted on a fixed guide rail. Of course, the positioning device 1 then preferably comprises two of such carriages 7, the column of products 2 circulating between them. In preferred cases where each product 2 is pivoted by the action of a pair of pushers 6, all of the pushers 6 are distributed, one half on one of the two carriages 7, and the other half on the other carriage 7. The products 2 are therefore driven in rotation each time by a pair of pushers 6, each of them being mounted on one of the carriages 7.

Such an assembly can be adapted by providing that the pushers 6 be mounted movably on the carriages 7 parallel to the direction of conveyance 4. The longitudinal mobility of the pushers 6 is therefore ensured, firstly by the mobility of the carriages 7 on which they are mounted, as well as by the mobility of their mounting on said carriages 7. One of the advantages of such an assembly compared to the preceding one is particularly, as will be described later, firstly being able to move the carriages 7 essentially at the same speed as the conveyor 10, as well as moving the pushers 6 to perform a grouping, spacing or any other function of predetermined longitudinal positioning of the products 2. Adjustments of the two functions can then be done independently.

In both of the cases just described, the carriages 7 can form a single movable structure.

In another type of embodiment, the pushers 6 are each mounted on a longitudinal guide rail 8 that is fixed with respect to the frame. Unlike the preceding assemblies, where the pushers 6 are mounted on carriages 7, the movement of which possibly enables the advance of the products 2 to be followed, here, only the placing of the pushers 6 in motion makes it possible to avoid creating a stop for the advance of the products 2. One of the advantages of such an arrangement, of course, is that each pusher 6, or each pair of pushers 6 acting together on the same product 2, can be controlled independently.

The movement of a pusher 6 is caused by a controlled actuator. Thus, the pusher 6 can for example be a rod of a pneumatic cylinder. While the positioning device 1 processes a plurality of products 2, it is equipped with a plurality of orientation means 5, one per product 2 to be processed. The positioning device 1 can therefore have a series of pushers 6 that are aligned in the direction of conveyance 4, or even [have] a second series facing it. The action of the pushers 6 side by side can be the same, that is, by construction, they are all moved with the same movement at the same time. For example, this can be the case when the pushers 6 are all mounted on a base connected to the rod of a single pneumatic cylinder. In this case, the movement of said single pneumatic cylinder defines the movement of each pusher 6.

Alternatively, each pusher 6 can, by construction, be moved in a movement that is different from the others. This can be the case when an independent pneumatic cylinder is associated with each pusher 6. The control of each pneumatic cylinder can then be independent, and each pusher 6 can be moved with a different movement. In particular, adjacent pushers 6 can change over from their inactive position to their active position at different times, based on a detected spacing of the products for example, as will be explained further on.

At the entrance of the positioning device 1, the spacing between the products 2 is difficult to foresee accurately. Indeed, even in the presence of possible upstream equipment intended to regularly space the products 2, the distances between two successive products 2 are generally within an interval of tolerance, particularly more or less 10% of a median value. The proper operation of the positioning device 1 therefore makes it necessary to identify accurately the relative position of the products 2, particularly when the positioning device 1 is capable of processing a plurality of products 2, and therefore comprises a plurality of orientation means 5, the relative position of which and/or the moments of triggering respective action movements must be controlled, in order to act synchronously in time and/or space with the sequencing of the products 2. To that end, therefore, the device comprises a detection cell 9, placed upstream from the at least one orientation means 5, which enables the successive presence of products 2 on the conveyor 10 to be detected. The detection cell 9 is connected to a control unit which processes the generated signal and thus controls the plurality of orientation means 5, and especially determines the relative position of the products 2 at the entrance.

Configurations in which the positioning device 1 can process a plurality of products 2 have the advantage of being able to work at higher speeds. Indeed, the operation of pivoting around an axis perpendicular to the plane of conveyance 3 requires a certain amount of time, and it is therefore more efficient to have a plurality of simultaneous positioning cycles, or at least cycles that overlap in time.

Possible methods of implementation of such a device will now be described.

A first method consists essentially of positioning the pushers 6 with respect to each other so as to reproduce the positioning relative to the plurality of products 2 that the positioning device 1 must process. Said positioning of the products 2 as they arrive in the positioning device 1 is detected by the detection cell 9 already described elsewhere.

The successive orientation means 5 are therefore moved with respect to each other in such a way that the product 2 of the plurality to be processed arrives at the same time at the orientation means 5 for which it is intended: the first product 2 of the series to be processed arrives facing the first orientation means 5 at the same time as the second product 2 of the series arrives facing the second orientation means 5, etc. It is then possible to simultaneously cause the action movements of the different orientation means 5, which makes it possible to use one and the same actuator to control all of the pushers 6 on the same side, or even on both. To implement this method, the orientation means 5 must therefore have the possibility of relative movement in the direction of conveyance 4.

Such a method therefore comprises a step of detecting the relative position of a series of products 2 to be processed, a step of relative positioning of the orientation means, and a step during which the pushers 6 change over from the inactive position to the active position During the orientation step per se, the orientation means 5 should preferably be moved in the longitudinal direction, which can be done, firstly, thanks to the assembly of the orientation means 5 that are free to move along the direction of conveyance 4, on a fixed guide rail 8 or on a carriage 7 that is movable in the same way, or secondly, by means of the carriage 7 on which they are mounted longitudinally secured and which is movable in the direction of conveyance 4.

Once the orientation is completed, a step of longitudinal positioning can be implemented, as described below. The cycle is completed by the changeover of the pushers 6 from their active position to their inactive position, then their return to position, causing them to undergo a movement opposite to the one they underwent to follow the advance of the products 2 on the conveyor 10.

In such a method, the irregularity of the relative position of the products 2 is thus managed by a relative movement of the orientation means 5, which can then be maneuvered simultaneously. In other methods described below, said irregularity can be managed by actuating the orientation means 5 at different times.

Figure 4:
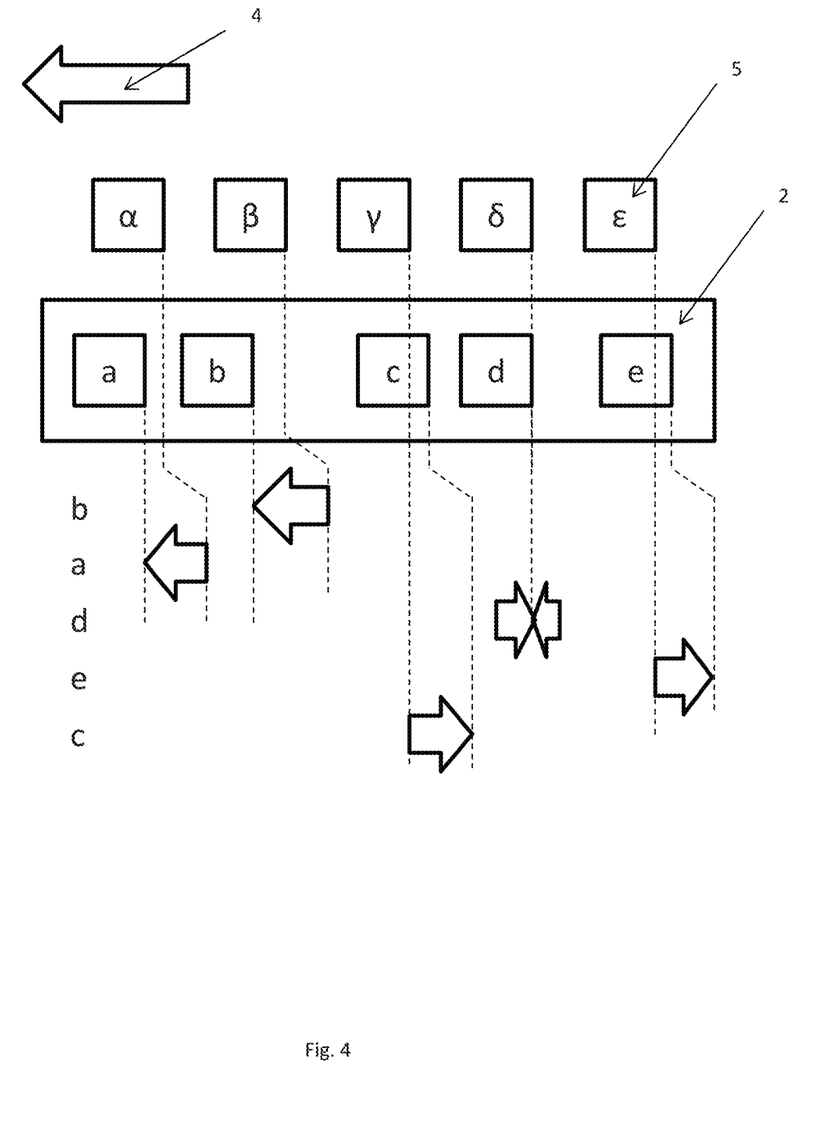
FIG. 4 compares the positioning of the orientation means according to a referencing scheme and products, in order to explain the idea of product the farthest ahead or farthest behind.

The appended FIG. 4 illustrates the idea of the product farthest ahead and the product farthest behind. In this case, the positioning device 1 is designed to process five products, referenced in the figure from a to e. To that end, the device comprises five respective orientation means 5, referenced $\alpha$ to $\epsilon$: $\alpha$ to process the product a, $\beta$ to process the product b, $\gamma$ to process the product c, $\delta$ to process the product d and $\epsilon$ to process the product e. The position of the orientation means 5 thus follows the desired referencing scheme.

The distance between a product 2 and the respective orientation means 5 is referenced from the orientation means 5, in the direction of conveyance 4. The product 2 for which this distance is the greatest is therefore the product farthest ahead, and the product for which this distance is the smallest, and even negative, is the product farthest behind. It will be understood that the classification of products does not depend on the relative position between the series of products on the one hand, and a series of orientation means 5 in their referencing scheme on the other hand. In the case of the figure, the product b is the one that is farthest ahead, then the product a, d, e, and the product farthest behind is c.

Thus, in this particular case, and while the sets of orientation means 5 cannot be moved with respect to each other in the direction of conveyance 4, but only actuated independently, this set of orientation means 5 is moved in such a way that one orientation means 5 arrives in front of the product farthest ahead, or the product farthest behind, for example for the product b and the orientation means $\beta$. To complete the orientation, it is then sufficient to continue moving the set of orientation means 5 with respect to all of the products 2 so that the other orientation means 5 come one after the other in front of the respective product, until completion, either with the product farthest ahead or with the product farthest behind, for example the product c and the orientation means $\gamma$. Of course, it is possible to begin with any product, then control the speed of the orientation means 5.

In general, therefore, the products are oriented beginning by placing the set of the orientation means 5, immobile with respect to each other, so that one of them arrives in front of a product at an end, such as the product farthest ahead, or respectively the one farthest behind, then by moving said set of orientation means 5 in such a way that they arrive successively in front of one of the other products to orient it, until all of the orientation means 5 are in a position such that one of them is in front of the other product at the end, such as the product farthest behind, or respectively, the one farthest ahead. Depending on the case, the set of orientation means 5 is thus moved, with respect to the set of products 2 to be processed, either in the same direction as the products on the conveyor 10, or in the opposite direction.

In the case of FIG. 4, it is therefore possible to place the orientation means 5 so that one of them is facing the product b and orients it, then to move them so that the orientation is done successively for the products a, d, e and finally the product farthest behind, the product c.

Conversely, it is possible to begin with the product farthest behind, the product c, and move the set of orientation means 5 to successively orient the products e, b, a and d, when the respective orientation means 5 are successively facing them, namely $\epsilon$, $\beta$, $\alpha$, then $\delta$.

If the operation begins with the product b, the orientation means 5 must be moved slowly with respect to the flow so that the other products are successively oriented. Conversely, if the operation begins with the product c, the orientation means 5 must be sped up for the others. The most advantageous in terms of cycle time is to begin with the one farthest behind, and to collect the others at higher speed. However, care must be taken to have as much product as orientation means 5, to ensure having complete lots.

This embodiment of the method is particularly suitable for cases in which the orientation means 5 are mounted fixed on movable carriages 7: indeed, it is then sufficient to apply the logic described above while controlling, on the one hand, the initial position of the carriages 7, then their movement, and on the other hand, the moments at which the orientation means 5 are actuated.

In another embodiment of the method, the different orientation means 5 can be actuated independently and one can be moved with respect to another with a movement along the direction of conveyance 4. Each one is actuated as soon as a product 2 arrives in front of it, which is identified by a detection cell 9 upstream thereof. Each orientation means 5 is therefore successively maneuvered, as a function of the flow of product 2. It is therefore possible to perform the orientation function even in cases where the products 2 arrive randomly spaced apart. The speed of longitudinal movement of the orientation means 5 can be the same as the conveyor 10, or it can be different, making it possible for example to retain the products 2 until a predetermined number has been collected and grouped together.

The method according to the invention can further comprise an additional step, during which the processed products 2 are placed along the direction of conveyance 4, according to a predefined scheme in the direction of conveyance 4. In effect, the orientation means 5 form two stops, one on each side of the product 2 in the direction of conveyance 4. By moving the orientation means 5 in the direction of conveyance 4, it is therefore possible, when in the active position, to move a product 2 forward or backward separately.

Such a step thus enables groups of product 2 to be produced, or to separate them, i.e. to space them out from each other at a predefined and repeated distance. In cases where the longitudinal movement of the orientation means 5 is used to form groups of products 2, it can be advantageous to retract the pushers 6, which arrive between two products 2, into their inactive position. The products 2 of the same group can then be in contact with each other, which is not possible if the orientation means 5 extend transversely between the products 2. The group of products 2 is then held between two end pushers 6, i.e. firstly, a pusher 6 farthest ahead in the direction of flow, and secondly, a pusher 6 farthest behind in the direction of flow. These two end pushers belong respectively to the orientation means 5 intended to act on the first and last products 2 of the lot.

The other pushers 6, after being retracted to allow the products 2 to come together, can then come into an intermediate position, in which they arrive at the interface between two products 2 successively; however, without separating them. In particular, this enables the products 2 to be stabilized.

The methods according to the invention can also have an additional step, during which the products 2 are staggered, under the action of the orientation means 5, transversely in the direction of conveyance 4. In this way, it is possible to divide the flow of products 2 into two parallel flows.

The rotation of the products 2 can be by any angle, in particular an angle of 90 or 45 degrees. Said rotation is generally accompanied by a change of longitudinal dimension. As has already been mentioned, an orientation means 5 forms a pair of stops, one towards the front of the flow and the other towards the rear. Moreover, the rotational movement is obtained in particular as a result of the fact that, in the direction of conveyance 4, the distance between said two stops is smaller than the dimension of the product 2 to be oriented. During rotation of the product 2 around an axis perpendicular to the plane of conveyance 3, the dimension of the product 2, measured parallel to the direction of conveyance 4, can vary, and the two stops then risk no longer being in contact with the product 2. Said product is then poorly controlled. It is therefore advantageous that the distance between the stops be able to be modified during the orientation maneuver. To that end, when the orientation means 5 goes into operation, the distance between the two pushers 6 that it comprises, or between the pusher 6 that it comprises and another stop, is modified by the movement of either of these two elements.

Although the foregoing description is based on embodiments, it in no way limits the scope of the invention, and modifications can be made, particularly by substituting technical equivalents or by a different combination of all or part of the characteristics developed above. In particular, it is possible to imagine that processing scenarios that are different from those described [above] could be applied.

The invention claimed is:

1. A positioning device for positioning products simultaneously with their conveyance one after the other in a plane of conveyance and along a direction of conveyance,
the device comprises:
at least one orientation means, the at least one orientation means comprising pushers, each movable along an action movement between an inactive position and an active position, the effect of said action movement being to act on a corresponding one of the products by pushing the product to make the product pivot by a predetermined angle around respective axis perpendicular to the plane of conveyance, the pushers also being movable in the direction of conveyance;
wherein the at least one orientation means is configured to be movable along the direction of conveyance relative to the products while the products move in the direction of conveyance; and
wherein two of the pushers are moveable relative to each other in the direction of conveyance while the at least one orientation means is moving in the direction of conveyance.

2. The device according to claim 1, wherein the pushers are mounted on a carriage that is movable in the direction of conveyance.

3. The device according to claim 1, wherein the pushers are mounted movably in the direction of conveyance of a carriage that is also movable in the direction of conveyance.

4. The device according to claim 1, wherein the pushers are mounted movably along the direction of conveyance on a fixed slide rail.

5. The device according to claim 1, wherein the at least one orientation means comprises a pair of similar pushers placed facing each other, so as to act together on the same product.

6. The device according to claim 5, wherein the distance between the two pushers of the pair of the at least one orientation means is adjustable in the direction of conveyance, thanks to a mobility in said direction of at least one of the two pushers.

7. The device according to claim 1, comprising at least one pair of orientation means, mounted side by side in the direction of conveyance, the side-by-side pushers being driven by the same actuator.

8. The device according to claim 1, comprising at least two orientation means, mounted side by side in the direction of conveyance, the side-by-side pushers being driven by actuators that are independently controllable.

9. A positioning device for positioning products simultaneously with conveyance of the products one after the other in a plane of conveyance and along a direction of conveyance,
the device comprises:
at least one orientation means, the at least one orientation means comprising at least one pusher movable along an action movement between an inactive position and an active position, the effect of said action movement being to act on a corresponding one of the products by pushing the product to make the product pivot by a predetermined angle around an axis perpendicular to the plane of conveyance, the at least one pusher also being movable in the direction of conveyance; and
a detection cell mounted upstream from the at least one orientation means in the direction of conveyance, in order to detect, one by one, each product to be oriented, as well as a control unit for receiving a signal from said cell and conditioning the functioning of the device; and
wherein the at least one orientation means is configured to be movable along the direction of conveyance relative to the products.

10. A method for positioning products simultaneously with their conveyance one after another in a plane of conveyance and along a direction of conveyance, comprising an orientation step, during which each of the products is turned around a respective axis perpendicular to the plane of conveyance, the method comprising:
achieving said orientation step by moving pushers along an action movement, between an inactive position and an active position, the effect of said action movement being to act on a corresponding one of the products by pushing each of the products to make the product pivot by a predetermined angle around the respective axis perpendicular to the plane of conveyance, said action movement being parallel to the plane of conveyance and perpendicular to the direction of conveyance; and
wherein the pushers are also moved along the direction of conveyance relative to the products being conveyed along the direction of conveyance; and
wherein positions of successive ones of the products is detected upstream from the orientation step, the method comprising positioning, in a corresponding manner in the direction of conveyance, the pushers located side by side, and this is done prior to the pushers being actuated between the inactive position and the active position for each of the pushers.

11. The method according to claim 10, further comprising a step of longitudinal positioning of the products, in the direction of conveyance, so as to position them with respect to each other at a predefined distance.

12. The method according to claim 10, wherein the orientation step is implemented when each product arrives in a predefined fixed zone.

13. The method according to claim 10, comprising a step of positioning a carriage, comprising the pushers side by side in the direction of conveyance, in a position such that a first one of the pushers is located facing a corresponding one of the products to be oriented, which is the farthest ahead or the farthest behind, according to a referencing scheme, the carriage then being moved in the direction of conveyance and another one of the pushers being actuated as soon as the another one of the pushers is located in front of another product.

14. The method according to claim 10, comprising staggering the products transversely in the direction of conveyance under the effect of the action of the at least one of the pushers.

15. A positioning device for positioning products simultaneously with their conveyance one after the other in a plane of conveyance and along a direction of conveyance, the device comprises:

orientation means comprising at least one pusher movable along an action movement between an inactive position and an active position, the effect of said action movement being to act on a product by pushing the product to make the product pivot by a predetermined angle around an axis perpendicular to the plane of conveyance, the at least one pusher being movable also in the direction of conveyance; and a detection cell mounted upstream from the orientation means in the direction of conveyance, in order to detect, one by one, each product to be oriented, as well as a control unit for receiving the signal from said cell and conditioning the functioning of the device.

16. A positioning device for positioning products simultaneously while the products are conveyed in a plane of conveyance and along a direction of conveyance, the device comprises:

an orientation device comprising a pusher movable along an action movement between an inactive position and an active position, the effect of the action movement being to act on a product that is one of the products conveyed by pushing the product to make the product pivot by a predetermined angle around an axis perpendicular to the plane of conveyance, the pusher also being movable in the direction of conveyance relative to the product conveyed in the direction of conveyance; and a detection cell mounted upstream from the orientation device in the direction of conveyance, in order to detect, one by one, each product to be oriented, as well as a control unit for receiving a signal from the detection cell and conditioning the functioning of the orientation device.

17. The device according to claim 16, wherein the orientation device comprises a plurality of pushers, and each pusher is controlled to be separately movable both upstream and downstream relative to the product conveyed in the plane of conveyance, thereby allowing a pitch between successive pushers to be adjusted.

* * * * *